United States Patent
Gehrig et al.

(10) Patent No.: US 7,412,980 B2
(45) Date of Patent: Aug. 19, 2008

(54) MACHINE FOR CLEANING GLASSES OR SIMILAR ARTICLES

(76) Inventors: Jean Gehrig, 87, Route des Auges, 74580 Viry (FR); Denis Gehrig, Immeuble Esgali, Les Cyclades 4, 74160 St. Julien En Genevois (FR)

( * ) Notice: Subject to any disclaimer, the term of this patent is extended or adjusted under 35 U.S.C. 154(b) by 653 days.

(21) Appl. No.: 11/020,609

(22) Filed: Dec. 22, 2004

(65) Prior Publication Data

US 2006/0032521 A1   Feb. 16, 2006

(51) Int. Cl.
  *B08B 3/00* (2006.01)
  *B65G 21/00* (2006.01)
  *B65G 41/00* (2006.01)
(52) U.S. Cl. .................. 134/137; 134/93; 134/138; 134/148; 134/159; 68/17 R; 198/494; 198/495; 198/499; 198/501; 198/860.3
(58) Field of Classification Search .................. 134/93, 134/137, 138, 148, 159; 68/17 R; 198/494, 198/495, 499, 501, 626.2, 860.1, 860.3
See application file for complete search history.

(56) References Cited

U.S. PATENT DOCUMENTS 5,143,101 A * 9/1992 Mor ........................ 134/58 R
5,225,853 A * 7/1993 Kobayashi et al. ............. 347/33
5,265,714 A * 11/1993 Hansen ........................ 198/832
5,423,418 A * 6/1995 Furrow .................... 198/860.3
5,453,132 A * 9/1995 Kowalchuk ................... 134/21
5,630,435 A * 5/1997 Brouchoud et al. ........... 134/68
5,794,635 A * 8/1998 Maines ...................... 134/95.3
6,302,817 B1 * 10/2001 Maute ........................ 474/144
6,406,549 B1 * 6/2002 Berg et al. ..................... 134/1
6,497,000 B1 * 12/2002 Russell ........................ 15/304

* cited by examiner

Primary Examiner—Michael Barr
Assistant Examiner—Rita R Patel
(74) Attorney, Agent, or Firm—The Weintraub Group, PLC

(57) ABSTRACT

A washing machine for glass lenses (11) or other similar items of the type including a conveyor (1) has a bearing surface (10) for moving the lenses through a washing chamber (12) made of a succession of washing means (21). The traction force transmitted to the aforementioned bearing surface (10) is carried out by two chains (13) with endless links (14), located on the both sides of the aforementioned bearing surface (10), each chain (13) being joined at the longitudinal side corresponding to the aforementioned bearing surface (10) and is stretched tight between two driving gears, of axis parallel to the plane of the aforementioned bearing surface and perpendicular to the direction of the displacement.

9 Claims, 6 Drawing Sheets

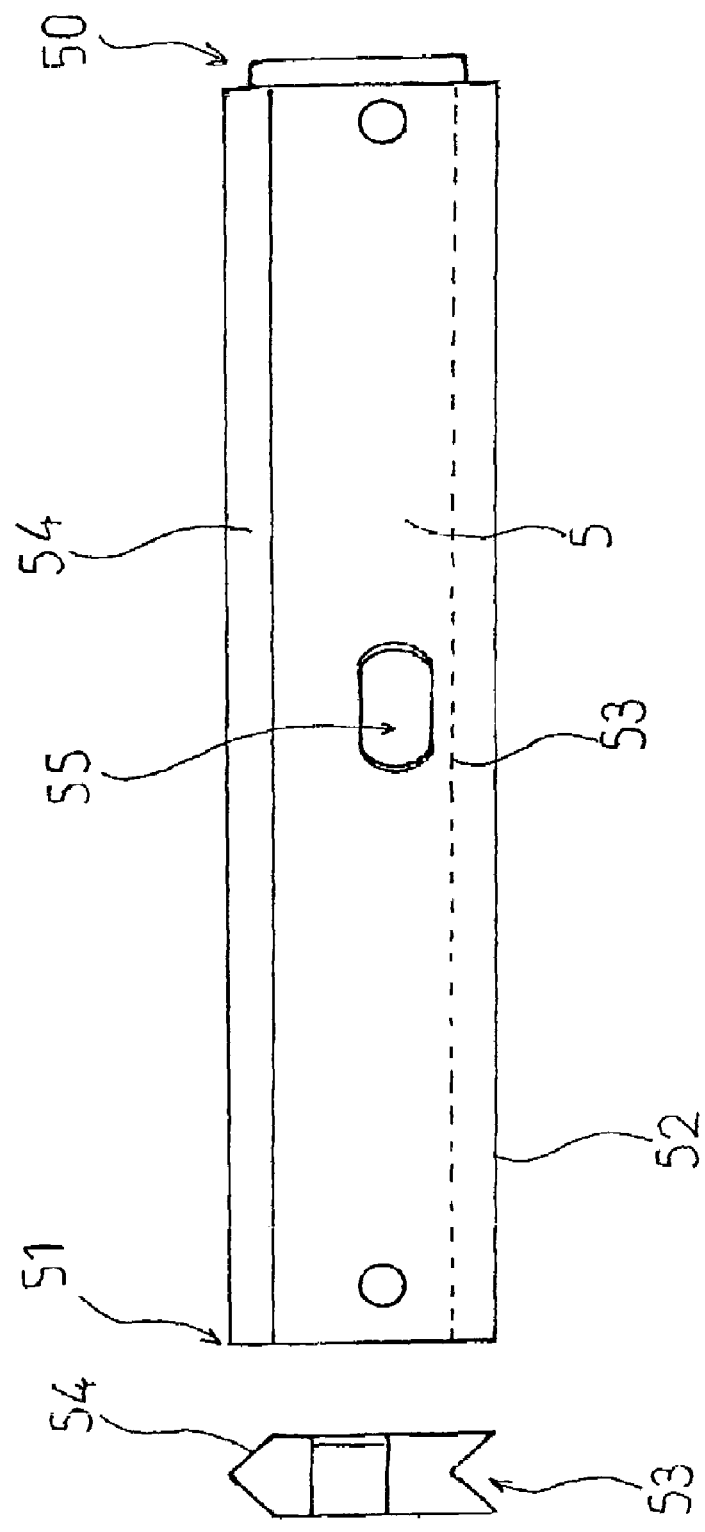

MACHINE FOR CLEANING GLASSES OR SIMILAR ARTICLES

Cross-Reference to Related Applications

Figure 1:
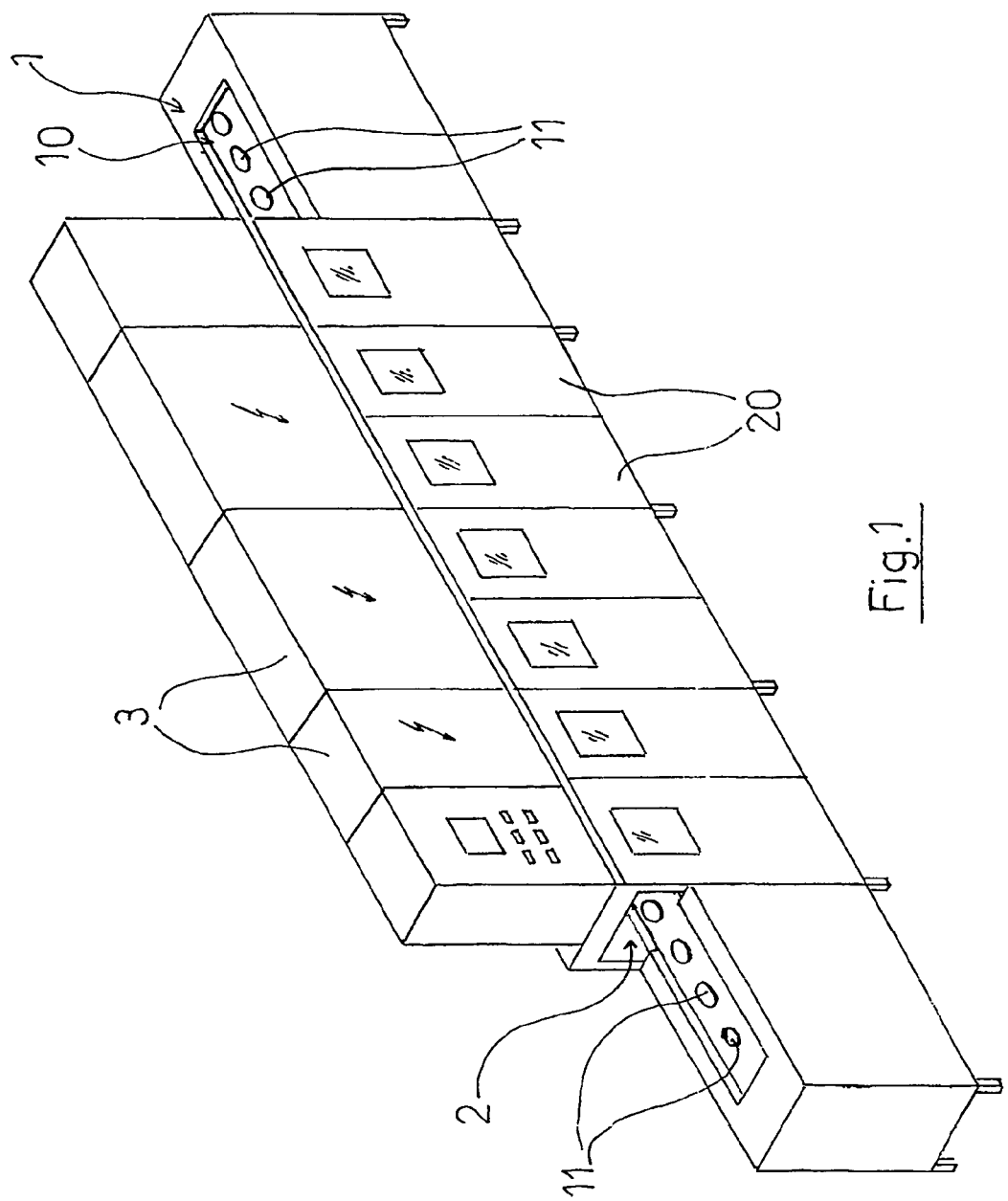

This Application claims priority to European Patent Application No. EP 020 160 10.7, which was filed on Jul. 18, 2002, the entirety of which is hereby specifically incorporated herein by reference.

The object of this invention is a washing machine for glass lenses or other similar items.

It is already known that washing machines for glass lenses are made of a conveyor consisting of a bearing surface of the aforementioned lenses continuously going through a tunnel made by a sequence of washing means such as rotary brushes, pulverization means of washing fluids, acid or basic solvents, rinsing and drying means. Bearing surface is directed to a horizontal plane and the traction force is transmitted to it by two chains with endless links located on the both sides of the aforementioned surface, each of them stretched tight, parallel to the latter, between two driving wheels with horizontal axis perpendicular to the displacement of the aforementioned bearing surface.

However, the chains' links retain the rinsing water and it results in a loss, up to 30%, of important and very expensive liquid.

The purpose of this invention is to find a solution for these disadvantages by offering a washing machine designed for organic parts or others and especially for glass lenses while avoiding loss of washing liquids.

According to this invention, the glass lenses washing machine is of type which includes a conveyor containing a bearing surface to the aforesaid glass lenses suitable to passing through a tunnel formed by a sequence of washing means, the traction force transmitted to the aforementioned bearing surface which is being implemented due to two endless link chains located on the both sides of the aforementioned bearing surface, each chain being joined at the longitudinal side corresponding to the aforementioned bearing surface and is stretched tight between two driving wheels, with axis parallel to the plane of the aforementioned bearing surface and perpendicular to the direction of displacement of the latter, and is primarily characterized by including, in one hand, two outlines, each housing one of the two chains and that of the aforementioned outlines comprise a longitudinal opening allowing the joining of the bearing surface to the said chains placed in the aforementioned outlines, and on the other hand, the waterproof pads joined to the bearing surface so that the aforementioned longitudinal opening was closed practically in each outline, which pads are being assembled in gliding parallel to the direction of displacement of the aforementioned bearing surface due to the guidance system.

The outlines will have a section in overall square or round shape, which one of the surface perpendicular to the plane of the bearing surface will be opened to allow the joining of longitudinal sides of the aforementioned bearing surface to the corresponding chains. On the other hand, the pads will be assembled in gliding axially on slide guides joined to the outlines.

According to this invention, in a preferred method of implementation of the outlines, the upper and lower longitudinal edges of the open sides of the outline will be inclined one towards the other and each lower longitudinal edge will contain, joined to its internal side, a slide guide of a square or round shape so that the gliding surface of the pads will be of the V or round shape. The pads will be able to include one of their longitudinal edges, a longitudinal socket in V shape complement to the sliding surface. The other longitudinal edge of the pads could be beveled in V to be inserted in a socket formed, for example, by the space made between the upper longitudinal edge inclined to the high inner side of the outlines and a square or round shaped part joined to the high inner side of the inclined upper edge aside from the latter and parallel to the slide guides.

According to the invention, each outline will be discontinuous and composed of the elements placed between them on certain distances to allow their opened loose ends, the flow of the washing residual water which would accumulate in the aforementioned outline, into the recuperative chambers located under the components of the aforementioned profiles.

The junction between two contiguous chambers will be located appreciably in the median plane of the space separating two successive elements of the outline and the bottom of the chamber will mainly present a longitudinal section in the V shape to allow the residual waters to flow out of the loose ends of the outline component in the aforementioned chamber toward the entry of a return gutter of the aforementioned residual waters to the retention tank which will be located at the level of the above mentioned foundation V.

The advantages and characteristics of this invention will more clearly excel from the following description which is referred to the attached drawing, which represents a non-restrictive method of implementation.

FIG. 1 presents a perspective front side view of the washing machine according to this invention.

Figure 2:
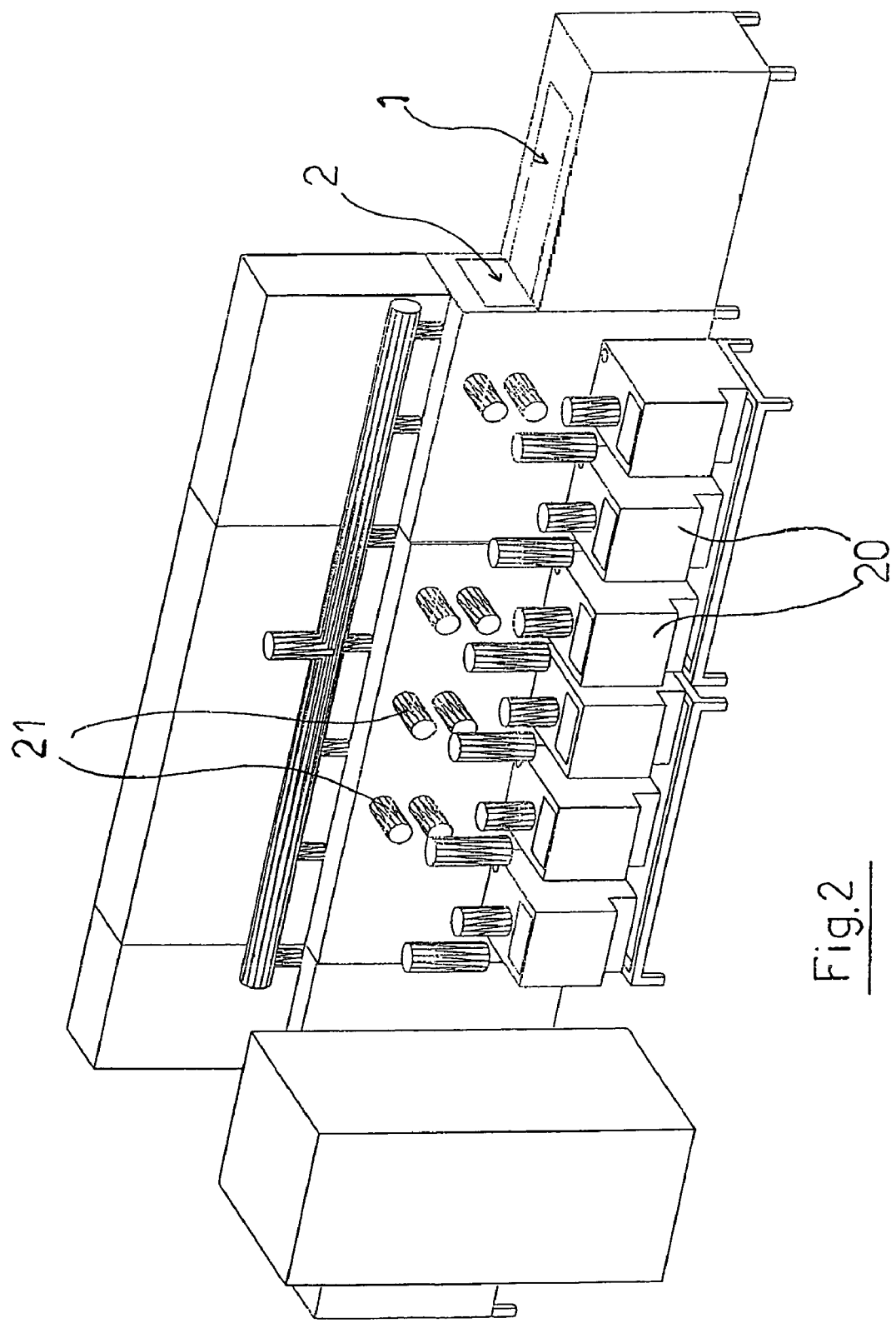

FIG. 2 presents a perspective back side view of the machine.

Figure 3:
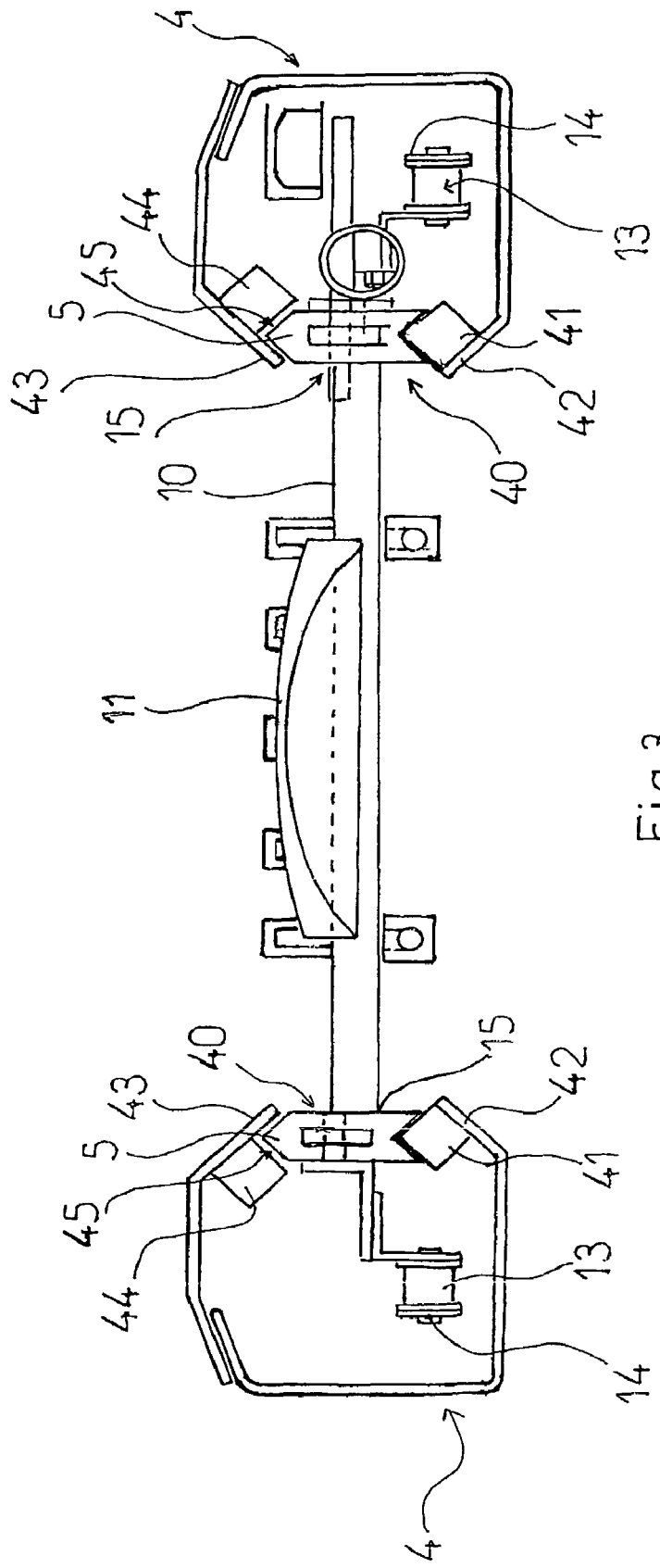

FIG. 3 presents a cross section view of the machine according to this invention.

FIG. 4 presents a profile view of the pad of the machine according to this invention.

FIG. 5 presents a face view of the pad of FIG. 4.

Figure 6:
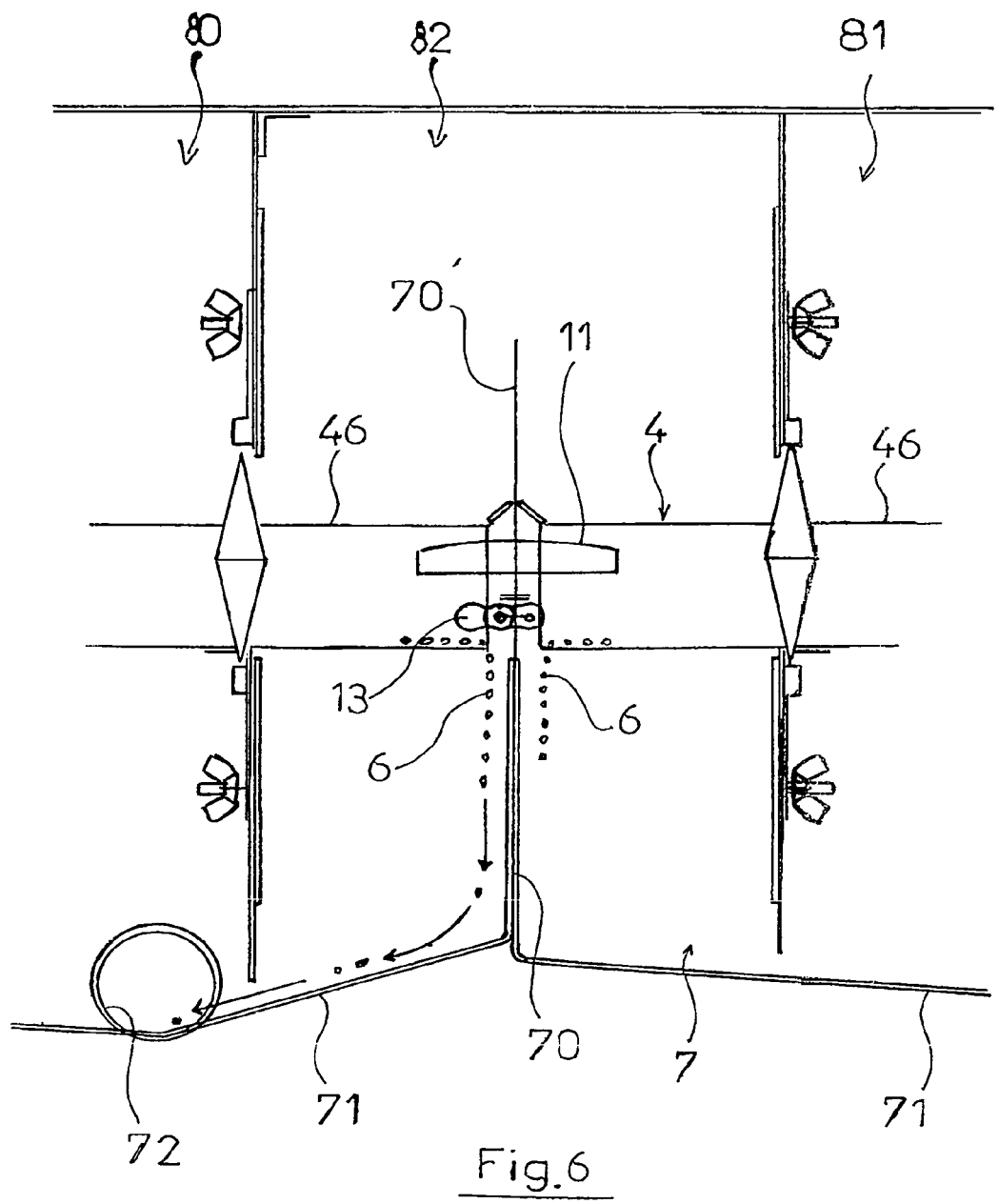

FIG. 6 presents a partial longitudinal cross section view of the machine.

Figure 7:
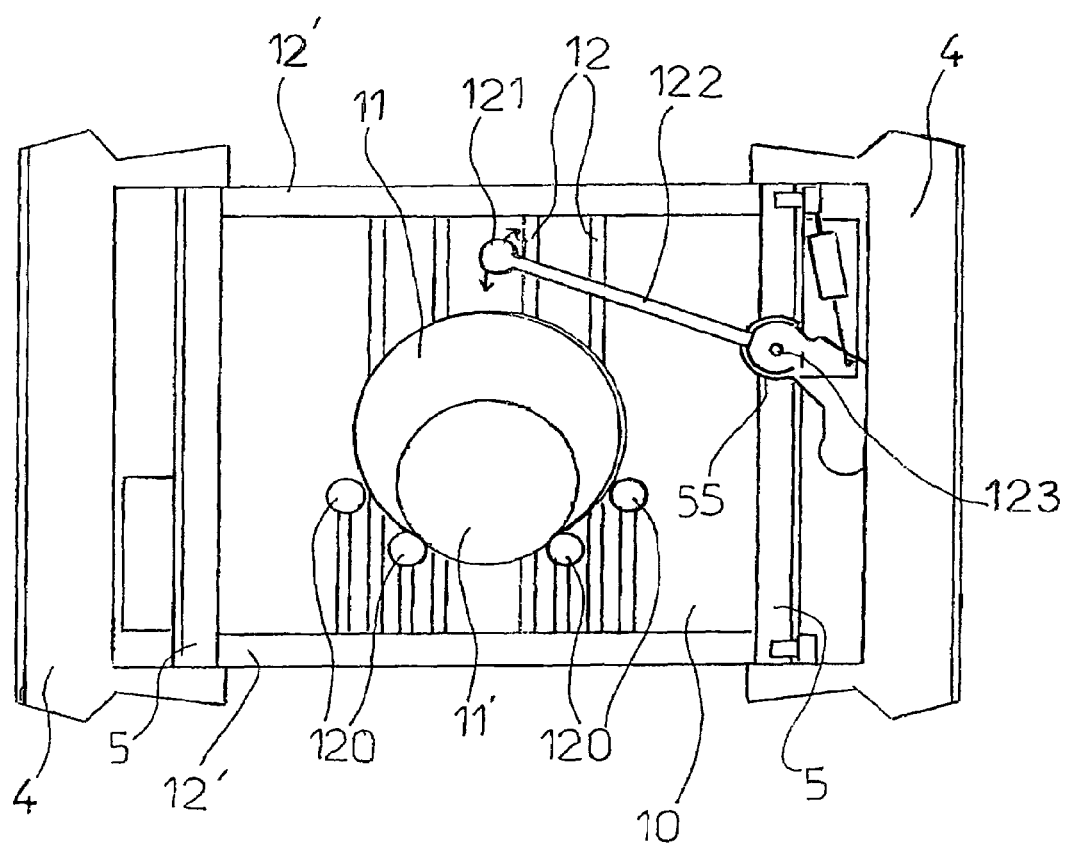

FIG. 7 presents a cross-section view of the top of a gripping device for glass lenses on the bearing surface.

If you refer to FIG. 1 and FIG. 2, you can see that according to this invention the machine, on one hand, is made of conveyor 1 including a bearing surface 10 of glass lenses 11 or some substrates to be cleaned located in the horizontal plane and on the other hand, of a cleaning tunnel 2 formed by a sequence of washing station 20, where tunnel 2 is crossed by conveyor 1 and means of control and operation 3 of the machine.

Washing stations 20 include motorized rotary cleaning brushes 21 and means which are not presented here, allowing washing fluids pulverization, acid or basic solvents, and rinsing as well as drying means.

If you refer now to FIG. 7, you can see that glass lens 11 is located on longitudinal support bars 12 joined between two support axes, transverse 12' and maintained in position between a fixed stop 120 and a flexible stop 121 joined at the loose end of arm 122 assembled in rotation about a vertical axis 123, allowing to maintain glass lenses 11, 11' and allowing different proportions.

You can also see on FIG. 3 that bearing surface 10 is mobile due to two endless chains 13 with links 14 joined parallel to bearing surface 10, on the both sides of the latter, each of them stretched tight between two driving toothed gears, not presented, to the horizontal perpendicular axis in the direction of displacement F of bearing surface 10.

Two chains 13 intended to transmit the traction force to bearing surface 10 are each located in outline 4 of the overall square section and opened to its longitudinal inner side 40 to allow the joining of the bearing surface 10 by its longitudinal edges 15 to the chains 13, which outline 4 is provided with a slide guide 41 of the square section joined at the inclined lower edge 42 of the inner longitudinal side 40 of outline 4 parallel to the latter.

The open inner surface 40 of the outlines 4 is closed with a waterproofing relative to the rinsing waters due to pads 5 of rectangular shape, as you can see it on FIG. 4, joined on one hand, together by junction of their loose ends 50, 51 and on the other hand, to the bearing surface 10 perpendicular to the latter by means of screws, not presented, screwed to the transverse support axes 12'.

Pads 5 are handled in axial sliding movement, parallel to the direction of displacement F of bearing surface 10, due to slide guides 41. To this effect, pads 5 are provided with one of their longitudinal edges 52 with a longitudinal socket 53 to a form complement to the sliding surface with slide guides 41 for their guidance in axial sliding movement.

The sliding surface of pads 5 is formed by the angular part of one of the edges of the slide guides in the square section.

In addition, you can see that other longitudinal edge 54 of pads 5 is beveled in V and intended to be inserted in socket 45 formed by the space made between the inclined upper edge respectively 43 and the inner side 40 of outline 4 and a part 44 joined with the inner side of the upper inclined edge 43, parallel to bearing surface 10, aside from the latter.

If you also refer to FIG. 7, you can see that pads 5 are provided with a transverse opening 55 intended for receiving the rotation axis 123 of arm 122 carrying on its loose end the movable stop 121 which allows the support of the glass lenses 11/11' on bearing surface 10 with the fixed stops 120.

Outlines 4 are discontinuous as you can see on FIG. 6 and consist of elements 46 located from a certain distance between them, for example, about 20 mm, opened at their loose ends so that the residual waters 6 which are accumulated at the bottom of outlines 4 can flow out by their ends, by gravity, in chambers 7 located under outlines 4. Junction 70 between two contiguous chambers is located appreciably in the median plane 70' of the space separating two successive elements 46 from outline 4.

You can also see that chambers 7 comprise an inclined bottom 71 of the longitudinal section in the V shape making it possible to convey residual waters 6 to the entry of a pipe 72 allowing delivering the residual waters 6 towards the tank of the corresponding retention, not presented.

You can also see on FIG. 6 two washing chambers 80, 81 and between those a connecting storage reservoir 82 for the washing chambers 80, 81. Separation between two elements 46 of an outline 4 is located in the connected storage reservoir.

Outlines 4 function as protection of chains 13 from rinsing water pulverization which helps to avoid a significant loss of rinsing water through drive connection between the chain links. Indeed, each link represents a captive volume which is likely to involve different flushing fluids. In the machines currently known, these captive volumes cause a significant loss of the flushing fluids as well as a mixture of those. Thus, the flushing fluids are diluted and destabilized creating pollution on the substrates such as optical glasses. Moreover, these dilutions and destabilizations imply consequent and frequent additions to the reservoir tanks for flushing fluids, therefore the cost for use and washing inefficiency are high because of pollution remaining on the substrates.

Thus, outlines 4 make it possible to avoid the supply of the flushing fluid through chains 13 and, if residual waters would accumulate in outlines 4, the discontinuity of those in connecting storage reservoir 82 allows the residual liquids to return to their corresponding reserves due to chambers 7 and pipes 72.

It will be noted that the shape of the slide of the square section or the shape of the rectangular pads could also be round without getting beyond the scope of this invention.

The invention claimed is:

1. Washing machine for glass lenses (11, 11 ') or other similar items of type including a conveyor (1) comprising a bearing surface (10) of the aforesaid glass lenses (11,11 ') is suitable for keeping moving through a washing chamber (12) made of a sequence of washing means (21), the traction force transmitted to the aforementioned bearing surface (10) being implemented due to two chains (13) with endless links (14), located on the both sides of the aforementioned bearing surface (10), each chain (13) being joined to the longitudinal side corresponding to the aforementioned bearing surface (10) and is stretched tight between two driving gears, of parallel axis to the plane of the aforementioned bearing surface and perpendicular to the direction of the displacement of the latter, it is characteristic that, on one hand it includes two outlines (4) protecting each of two chains and that the aforementioned outlines (4) comprise a longitudinal opening (40) allowing bearing surface (10) to join to the said chains (13) located in the aforementioned outlines (4) and on the other hand, waterproofing bars joined to the bearing surface (10) to close the aforementioned longitudinal opening used in each outline (4), which pads (5) being assembled in gliding parallel to the displacement of the aforementioned bearing surface (10) due to guidance means (41, 44, 43).

2. According to claim 1, the machine's characteristics are that the outlines (4) have a section of an overall square or round shape and that one (40) of the surfaces, perpendicular to the plane of bearing surface (10), is opened to allow the joining on the longitudinal sides (45) of the aforementioned bearing surface (10) to the corresponding chains (13) and that the pads (5) are assembled in gliding axially on the slides joined to the mentioned outlines (4).

3. According to claim 2, the machine's characteristics are that the longitudinal upper (43) and lower edges (42) of the open surfaces (40) of the outlines (4) are inclined one towards the other and that each lower longitudinal edge (42) comprises, joined with its internal side, a slide (41) of square or round section so that the sliding surface of the pads presents a V or round shape and that the pads include one (52) of their longitudinal edges a longitudinal socket (53) of a V or round shape complementary to the sliding surface.

4. According to claim 3, the machine's characteristics are that the other longitudinal edge of the pads (5) is a V-shaped bevel and is intended to be inserted in a socket (45) formed by the space created between the upper inclined longitudinal edge (43) of the internal side (40) of outline (4) and a part (44) of square or round section joined with the internal side of the upper inclined edge (43) aside from the latter and parallel to the slides (41).

5. According to claim 2, the machine's characteristics are that each outline (4) is composed of several elements (46) located between them on a certain distance to allow, by their open loose ends (47), flow of the residual rinsing water (6) which is accumulated in the aforementioned outline (4), in the recuperative chambers (7) located under the aforementioned elements (46).

6. According to claim 1, the machine is characterized by pads (5) being joined among them by fitting to their loose ends.

7. According to claim 1 the machine's characteristics are that glass lenses (11,11'), transported by the bearing surface (10) are maintained in position on the aforementioned bearing surface (10) between a fixed stop (120) and a movable stop (121) joined at the loose end of the arm (122) shown swiveling around an axis (123) perpendicular to the aforementioned bearing surface (10) and that the pads (5) comprise a transverse opening (55) intended to receive the aforementioned rotation axe (123).

8. According to claim 1, the machine is characterized by pads (5) being joined to the surface by screws.

9. According to claim 8, the machine's characteristics are that the junction (7) between two contiguous chambers (7) is located appreciably in the median plane (70') of the space separating two successive elements (46) from outline (4) and that bottom (71) of a chamber (7) presents a longitudinal section in the V shape to allow residual waters to flow out of the open loose ends (47) of an element (46) of a outline (4) in the aforementioned chamber (7) toward the entry of a return gutter (72) of the aforesaid residual waters to the retention tank.

\* \* \* \* \*